Sept. 17, 1957 G. E. FRIEDBERG 2,806,415
MULTIPLE-EXPOSURE CAMERA
Filed May 13, 1954 3 Sheets-Sheet 1
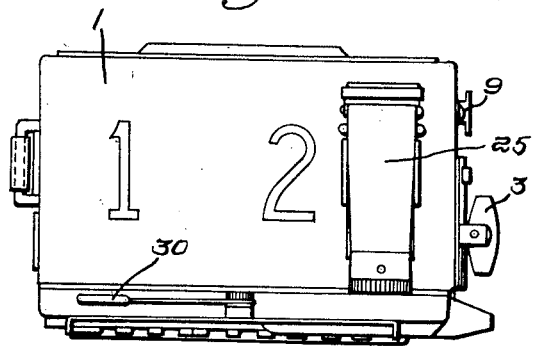
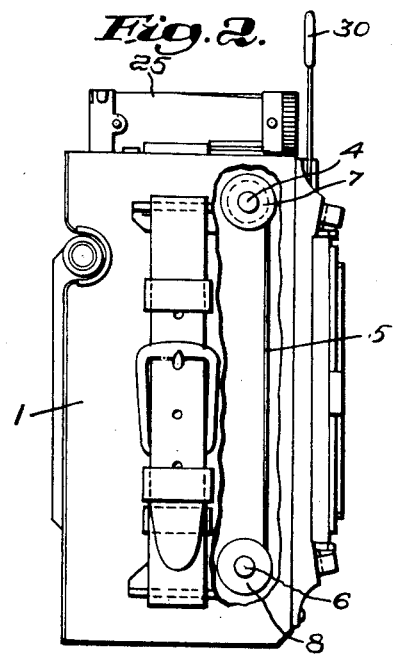
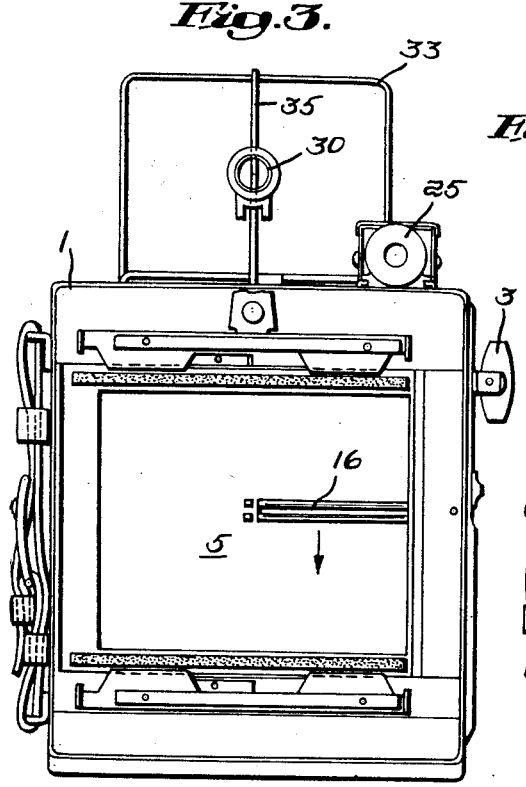
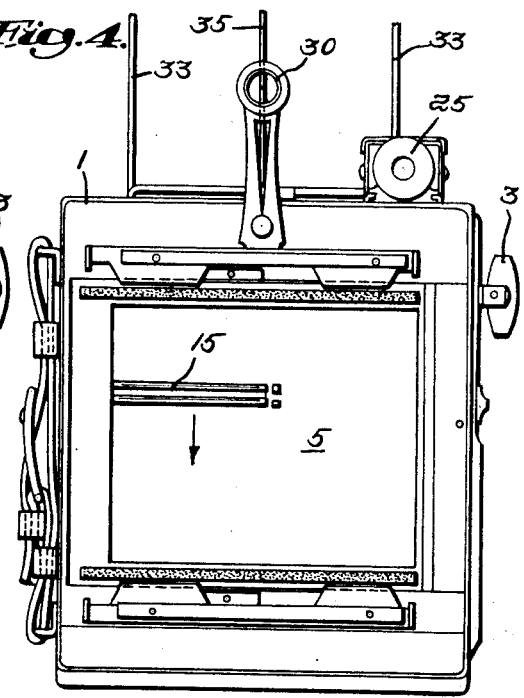
Inventor:
Gilbert E. Friedberg
by James R. Hodder
Attorney

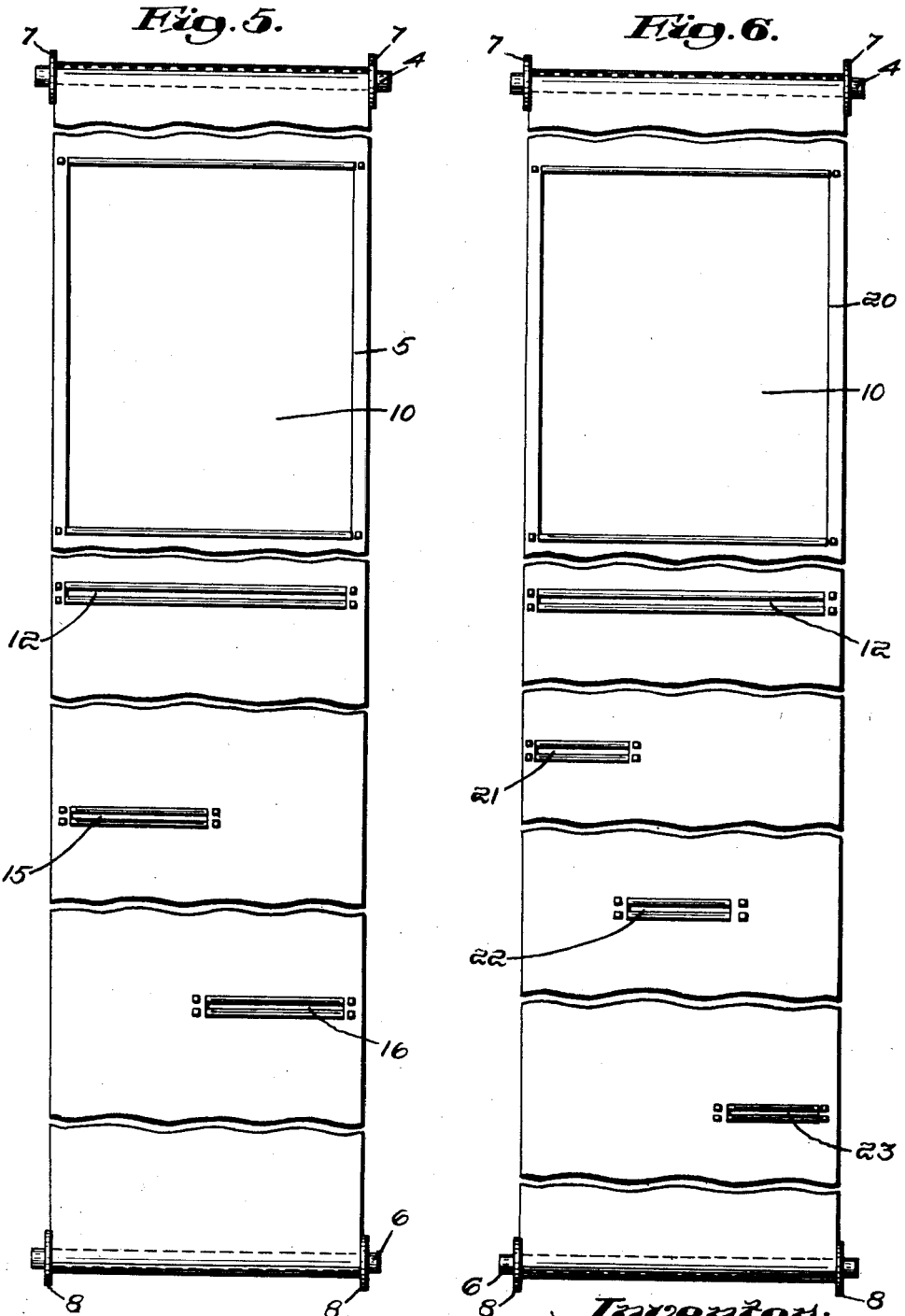

Sept. 17, 1957  G. E. FRIEDBERG  2,806,415
MULTIPLE-EXPOSURE CAMERA
Filed May 13, 1954  3 Sheets-Sheet 3
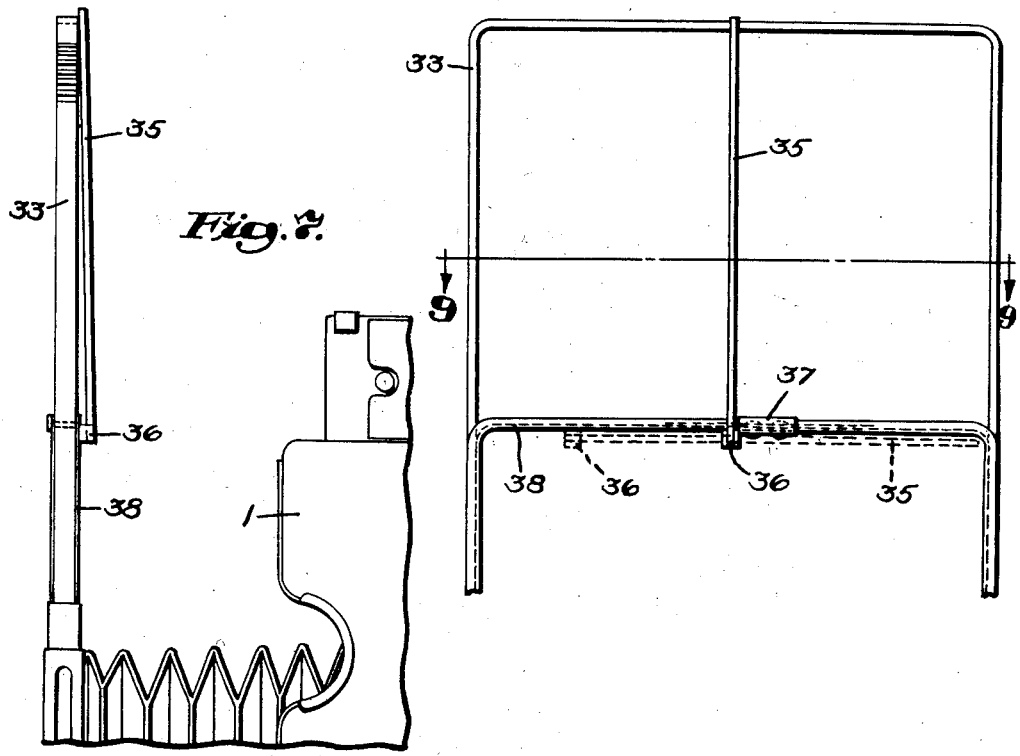
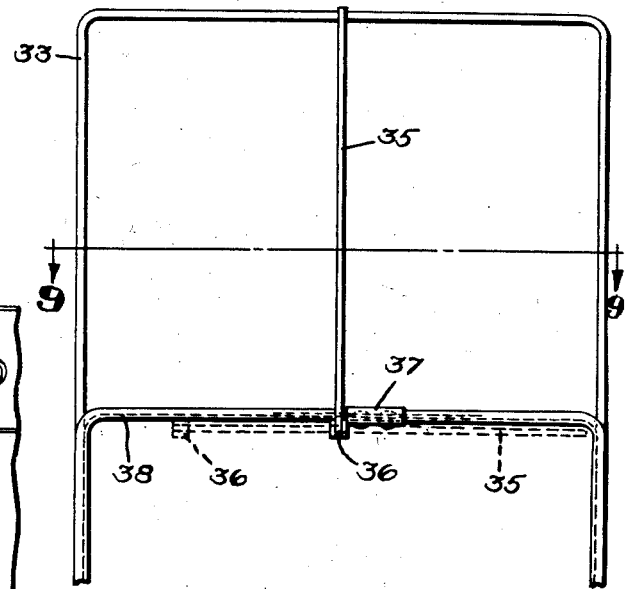
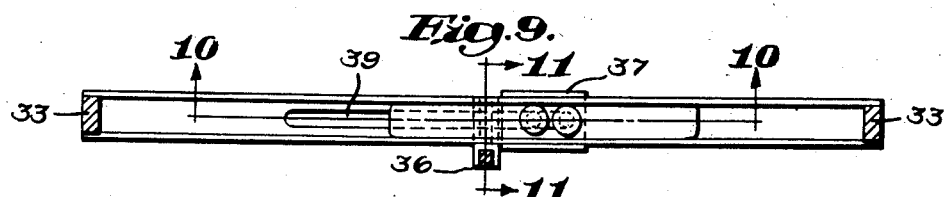
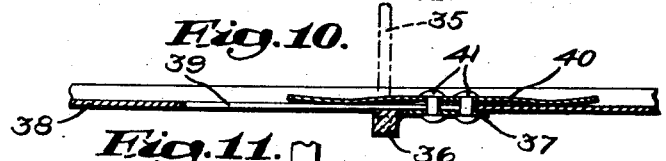
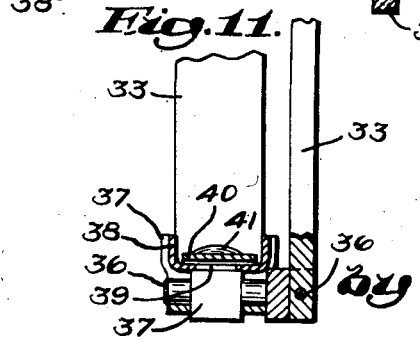

United States Patent Office 2,806,415
Patented Sept. 17, 1957

2,806,415
MULTIPLE-EXPOSURE CAMERA
Gilbert E. Friedberg, Malden, Mass.

Application May 13, 1954, Serial No. 429,459

1 Claim. (Cl. 95—36)

My present invention relates to cameras and particularly to such cameras wherein a plurality of successive exposures and consequent pictures can be taken on the same photographic plate or film.

Heretofore various devices have been developed for enabling two or more pictures to be taken on the same plate, which, however required manual shifting of slides or screens, involving an appreciable time and skill and were, therefore, objectionable.

Where a portable camera was employed, such as generally used in newspaper work to catch critical situations, such as in the sports field, athletic meets, baseball and football games, horse racing, boat racing, or the like, it has been necessary to shift the plates employed, which involved too much time to catch successive critical situations which might happen in rapid split-second sequence. Thus, an operator would take what he though would be a critical play and then while shifting plates, would miss a more critical situation immediately following that photograph, which latter, of course, would be lost forever during the plate-shifting and manual operation ordinarily required.

My present invention obviates the difficulties above briefly outlined and enables me to secure on the same plate or film a plurality of successive plays or other critical situations of great interest, particularly in newspaper work, without shifting the plate, re-loading, re-setting, or any other manual operation, excepting the pressing of a button.

Thus, my invention permits an operator to take one "shot" and instantly have the camera ready to take a succeeding more critical situation or play either at the succeeding fraction of an instant or with a considerable time lapse, the camera being ready, all on the same plate.

In carrying out my present invention, I provide a novel curtain, screen, or shutter, which I have designated as a "split-curtain," which traverses the face of the photographic plate and which split-curtain is provided with means to take full-sized picture when desired, or a plurality of successive pictures, which latter simultaneously shields one part of the plate while exposing another part for a predetermined length of travel of the shutter. Thereupon, the screen or shutter is stopped and is in position for a successive exposure on the previously shielded part of the plate.

Thus, in the type of camera where the curtain extends between two rollers across the face of the photographic plate and actuatd by a wound spring to travel from one roll to another by the release of the spring-wound roller to travel a predetermined distance before stopping, I arrange the openings in the curtain in staggered relation and provide an increased length in the curtain, such for example as to permit two or three of such staggered openings, with the spring winding on one roller of appropriate capacity to handle such increased screen length and with releases and catches on the spring roller proportioned to the travel of the screen between the staggered openings, wherein, when one opening is flashing across the plate, the rest of the plate is shielded; and thereupon, by a second release of the spring, another part of the plate receives the exposure, while the first impression taken on the plate is shielded.

Thus, a succeeding exposure is capable of being taken either instantly, after the first picture or at any subsequent delayed time, the camera being thereby fitted to take successive pictures without shifting a plate or re-loading the same.

A further feature of the present invention is that I provide means to proportion the width of the succeeding openings in the screen for a partial unwinding and decreased strength and speed of the spring-wound roll so that all pictures can be taken at the same critical focus and efficiency.

As these staggered openings in the screen or shutter extend widthwise, I provide means on the sighting instrumentalities of the camera to enable the operator to more accurately direct the camera toward the subject in alignment with the particular staggered opening being flashed across the plate for the picture-taking operation.

Further improvements, novel advantages, and combinations will be hereinafter more fully pointed out and claimed.

Referring to the drawings, wherein I have illustrated a typical portable camera of the Graflex type:

Fig. 1 is a side view;

Fig. 2 is an end view with a portion of the case broken away to show the spring-winding spools with the shutter therebetween;

Fig. 3 is a front view illustrating the screen with an opening traversing the face of the plate, giving one exposure while shielding the rest of the plate;

Fig. 4 is a corresponding view illustrating the openings in the shield for the second exposure;

Fig. 5 is a diagrammatic view illustrating the length of screen with a full-width opening and right and left staggered openings for successive pictures;

Fig. 6 is a similar view illustrating the three staggered openings in combination with a full-width slot or opening, although it will be appreciated that the full-width slot in both Figs. 5 and 6 can be eliminated if desired;

Fig. 7 is a fragmentary side view illustrating my improved sighting means;

Fig. 8 is a fragmentary front view of the same;

Fig. 9 shows a cross-sectional view on the line 9—9 of Fig. 8;

Fig. 10 shows a cross-sectional view on the line 10—10 of Fig. 9; and

Fig. 11 is a fragmentary cross-sectional view on the line 11—11 of Fig. 9.

Referring to the drawings, wherein I have illustrated my invention as applied to a well known and standard type of Graflex Speed Graphic camera, although other types of cameras can be advantageously employed, the casing of the camera is designated generally at 1, as shown in Fig. 1 in top plan view, with a winder 3 on the upper roll 4, with my novel split curtain illustrated at 5, best shown in the broken-away portions of Fig. 2, said curtain extending between the upper roll 4 and a lower roll 6, which lower roll is also spring-rotated when the upper roll 4 is released a predetermined distance by the trigger 10. The usual flanges 7—7 on the upper roll, and 8—8 on the lower roll 6 are provided between which the curtain is guided during the rolling and unrolling operation.

The usual curtain in this type of camera is provided with an unperforated section 10 as a shield or shutter and then an adjoining full length slot as indicated at 12, see Figs. 5 and 6, which flashes across the plate on which a picture is to be taken thru the slot 12 upon release of the roll 4 by the action of a button or trigger 9.

My novel screen includes a section with a plurality of staggered slots for successive widthwise exposure of one-half the plate while shielding the other half of the plate during the photographing operation. Thus, as shown in Fig. 5, I have illustrated two staggered slots, as indicated at 15 and 16, thus providing the opportunity for taking a picture on one-half the photographic plate in the camera as the curtain is moved from roll 4 to roll 6, while simultaneously shielding the remaining half widthwise of the plate.

This may be operated either for vertical movement or horizontal movement as desired; whereupon the camera is ready for an instant second operation to allow the slot 16 to flash across the plate and take a second picture either instantaneously or at any subsequent time desired, while simultaneously shielding the picture taken on the first exposure.

Thus I am enabled to take a succession of views, with a succession of exposures at a fraction of a second apart and in the same focus when desired. Or I may hold the second picture ready for instant operation at any predetermined time desired, while still shielding the first picture taken.

As shown in Fig. 6 I have illustrated a longer curtain 20 with a series of staggered slots, as shown at 21, 22, and 23 dividing the curtain widthwise into three portions.

A further feature of my present invention consists in the proportionate arrangement of the width of the succeeding slots to substantially correspond with the decreased power of the spring on the roll 6 and thereby to allow for the decreased speed of travel of my split curtain 5 or 20, or the curtain is wound up on the lower roll when released from the upper roll by the operation of the trip, trigger, or button 9. Thus, where a curtain 20, as shown in Fig. 6, has three slots, the second and third slots 22 and 23 are also proportioned to be enlarged sufficiently to insure a uniform light exposure in time corresponding to the decreased speed of travel of the curtain from one roller to the other because of the decreased power of the tension of the spring actuating same.

I find that this lack of time element in the line of travel of the curtain is very important and extends as much as twenty-five percent on each successive slot opening, viz., as much as three thirty-seconds on the second slot to four thirty-seconds on the third of the total time involved.

From the foregoing, it will be appreciated that I am enabled to take a plurality of pictures on the same plate by my split-curtain screen, which takes a series of full length pictures widthwise of the plate and in the same focus when so desired, and in quick succession without the necessity of plate removal or replacement or any other manual setting, adjusting, or the like movement, excepting simply the trip actuation of the screen.

Such a tripping can be effected at a remote distance by utilizing a bulb or electrical actuation, if desired, as will be readily appreciated. In order to still further effectively take successive pictures on the same plate widthwise of the plate by means of my split-curtain invention and the slot openings proportionate with the actuation of the winding spring on the curtain, I provide means for the operator to focus the camera, first to the right for the first picture, and then slightly to the left for the second picture.

For this purpose, in addition to the usual parallax finder 25, rear view finder 30, and frame 33 with which this type of camera is usually equipped, I provide an adjustable center division rod 35, which serves to divide the sighting frame 33 into a right and left field of vision so that the operator, after setting the camera in the focus desired, may then view the object to be photographed, with the curtain 10, for example, in operation thru the left opening in the forward finder, viz., to the right of the center rod 35, which will more accurately locate the picture to be taken thru the first slot 15; and then the operator may shift his view to the opposite side for the second picture thru the slot 16.

Similarly, the operator may align the front and rear finders for the successive pictures in the slots 21, 22, and 23 as will be readily appreciated.

Any suitable way of positioning the center rod 35 may be provided, viz., as best shown in Figs. 7 to 11. I may secure the lower end of the rod 35 to a cross-shaft 36 mounted on a slide 37, mounted on the cross-bar 38 which carries the frame 33. This cross-bar 38 is formed as a channel member into which the frame 33 may be slid to be housed therein, and with the slide 37 preferably traveling in a slot 39 formed in the top of the cross-bar 38, to which cross-bar a spring 40 is attached by one or more rivets 41 extending thru the slot 39 to hold the slide in yielding engagement with the bottom of the cross-bar 38, such slide 37 and spring 40 being of greater width than that of the slot 39.

This arrangement permits the rod 35 to be slid on the cross-bar 38 to the left, as shown in dotted lines, viewed in Fig. 8, and then to be folded downwardly so that the entire frame and rod 35 may be compactly enclosed within the dimensions of the camera for transportation, the tension of the spring 40 holding the rod either in collapsed or operative position.

It will thus be appreciated that my invention provides for the immediate sequence of a plurality of pictures on the same plate, while shielding either the unexposed portion of the plate while taking one or more pictures and, accordingly, shielding also the exposed portions of the plate during the taking of successive pictures by means of my novel split curtain and the proportionate slot openings cooperating with the spring action on the curtain when tripped, thus having one, two, or more "shots" in reserve, all on the same plate after the taking of the first picture. Furthermore, I provide novel sighting instrumentalities to facilitate the taking of different pictures widthwise of the plate, and I wish to claim all these features herein broadly.

I claim:

A high-speed camera of the kind described, having a single removable photographic plate, a movable curtain operating across said plate, spring-actuated means released by the pressing of a button to cause said spring to move said curtain a predetermined distance, said curtain formed with at least two widthwise openings in said curtain for a split-second successive exposure of a predetermined portion of the plate while protecting the remaining portion of the plate, said openings being proportioned, respectively, in size, area, and position to cooperate with the speed of curtain movement proportioned to the unwinding power of the spring controlling the travel of the curtain for a predetermined distance across said plate, the second curtain opening being larger than the first opening, in combination with front and rear sighting instrumentalities, and means for selectively controlling one of the sighting instrumentalities to direct the operator's vision toward the portion of the photographic plate to be traversed by a selective curtain opening, thereby to direct at least two photographic flashes successively in split-second sequence on predetermined sections of the same photographic plate.

References Cited in the file of this patent

UNITED STATES PATENTS

| | | |
|---|---|---|
| 864,643 | Henderson | Aug. 27, 1907 |
| 1,109,077 | Lockyer | Sept. 1, 1914 |
| 1,991,924 | Dolan | Feb. 19, 1935 |
| 2,114,024 | Kondolf | Apr. 12, 1938 |